United States Patent

[11] 3,620,941

[72] Inventor Forrest N. Ruehlen
  Bartlesville, Okla.
[21] Appl. No. 13,680
[22] Filed Feb. 24, 1970
[45] Patented Nov. 16, 1971
[73] Assignee Phillips Petroleum Company

[54] ELECTROCHEMICAL FLUORINATION OF 1,2-DICHLOROETHANE AND 1,1,2-TRICHLOROETHANE
8 Claims, 1 Drawing Fig.

[52] U.S. Cl. .................................................. 204/59
[51] Int. Cl. .................................................. B01k 3/00
[50] Field of Search .......................................... 204/59

[56] References Cited
UNITED STATES PATENTS

| | | | |
|---|---|---|---|
| 3,551,307 | 12/1970 | Gray ............................. | 204/59 |
| 3,298,940 | 1/1967 | Ashley et al. .................. | 204/59 |
| 2,519,983 | 8/1950 | Simons ......................... | 204/59 |

Primary Examiner—John H. Mack
Assistant Examiner—Neil A. Kaplan
Attorney—Young and Quigg ABSTRACT: In the electrochemical fluorination of 1,2-dichloroethane and 1,1,2-trichloroethane feedstocks, the selectivity to the products 1,2-dichlorotetrafluoroethane and 1,1,2-trichloro-1,2,2-trifluoroethane is increased by charging a mixture of said feedstocks to the electrochemical fluorination cell instead of charging said feedstocks to the cell separately.

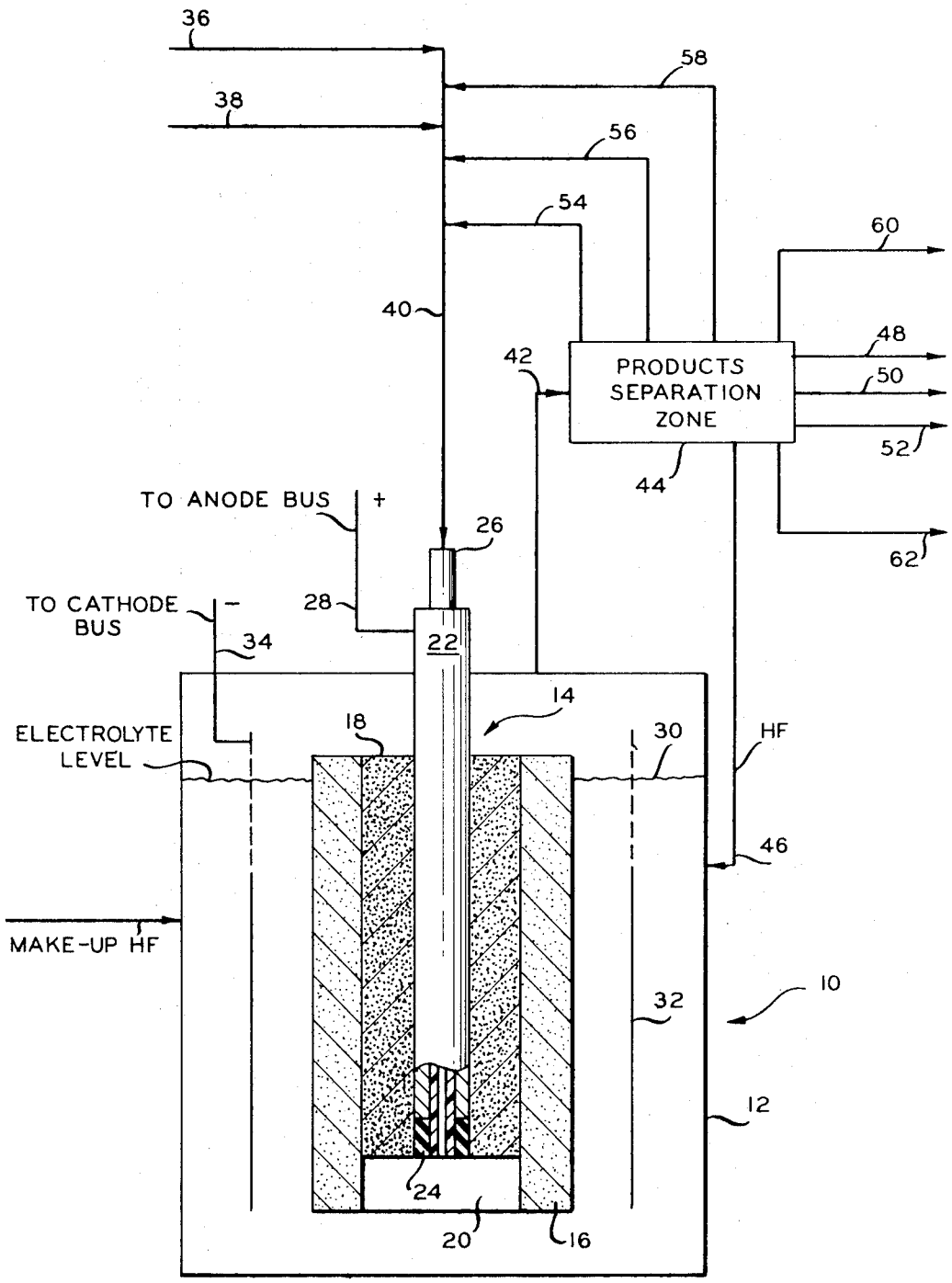

ELECTROCHEMICAL FLUORINATION OF 1,2-DICHLOROETHANE AND 1,1,2-TRICHLOROETHANE

This invention relates to the electrochemical fluorination of 1,2-dichloroethane and 1,1,2-trichloroethane.

Electrochemical fluorination processes for converting a wide variety of feedstocks into desirable fluorinated products are well known in the art. Generally speaking, these processes usually involve immersing an electrode element in an electrolyte and passing an electric current through said electrolyte between said electrode and an oppositely charged element, e.g., either another electrode immersed in said electrolyte or the cell body which can serve as said other element. The feedstock to be fluorinated is then brought into contact with the anode and at least partially converted at said anode, or in the region thereof, into the desired product or products. In one electrochemical fluorination process the feedstock is brought into contact with the anode by dissolving said feedstock in the electrolyte. In a variation of this process, the feedstock is bubbled into the electrolyte through a porous anode, such as porous carbon. Recently it has been discovered that the reaction in an electrochemical conversion process can be carried out within the confines of the porous electrode element itself, e.g., within the pores of said porous electrode. This type of operation is of particular utility in electrochemical fluorination. Carrying out the fluorination reaction within the pores of a porous anode allows operation at higher rates of conversion, and without the formation of substantial amounts of cleavage products generally produced by the older methods when operating at high conversion rates. The feed to be fluorinated is introduced into the porous anode at a point near its bottom and the fluorinated mixture exits at the top of the anode, or above the electrolyte level or slightly below said level. Passage of the feedstock into the bulk of the electrolyte is avoided.

Two valuable fluorinated compounds are 1,1,2-trichloro-1,2,2-trifluoroethane and 1,2-dichlorotetrafluoroethane. Said trichlorotrifluoroethane is a valuable specialty degreasing solvent. It is widely used, particularly in the aerospace industry, for cleaning instruments, gears, and other parts which must be rendered especially clean or grease-free. Said dichlorotetrafluoroethane is a valuable precursor for, and can be readily converted to, tetrafluoroethylene. Said tetrafluoroethylene is an unsaturated fluorocarbon having valuable utility in various applications. One particular valuable utility is in the form of its various polymers, several of which have achieved commercial success. For example, the polymer of resin Teflon is widely used as a coating material in many applications where a coating material having release properties is desired, e.g., in the coating of cooking utensils. Teflon also has other well known utilities.

Both said 1,2-dichlorotetrafluoroethane and 1,1,2-trichloro-1,2,2-trifluoroethane are produced When 1,2-dichloroethane is electrochemically fluorinated; with the process being much more selective to the production of said dichlorotetrafluoroethane. Both said 1,2-dichlorotetrafluoroethane and said 1,1,2-trichloro-1,2,2-trifluoroethane are also produced when said 1,1,2-trichloroethane is electrochemically fluorinated; with the process being much more selective to the production of said trichlorotrifluoroethane. Thus, if one were interested primarily in the production of 1,2-dichlorotetrafluoroethane, one could use 1,2-dichloroethane as the feedstock. If one were interested primarily in the production of 1,1,2-trichloro-1,2,2-trifluoroethane, one could use 1,1,2-trichloroethane as the feedstock. However, problems are encountered in (1) the efficient utilization of plant equipment, and (2) the efficient utilization of said feedstocks, when one desires to make both of said products.

The present invention provides a solution to said problems. I have now found quite unexpectedly, that the overall yield of said products 1,2-dichlorotetrafluoroethane and 1,1,2-trichloro-1,2,2trifluoroethane i.e., the overall selectivity to the production of said products, can be increased by charging both said 1,2dichloroethane and said 1,1,2-trichloro-1,2,2trifluoroethane simultaneously as the feedstock to the electrochemical fluorination cell. I have also found, quite unexpectedly, that the efficiency of conversion of the 1,1,2-trichloroethane in the combined feedstock to the 1,1,2-trichloro-1,2,2-trifluoroethane product and its precursors is also increased; and that this is accomplished without any significant sacrifice in the efficiency of conversion of the 1,2-dichloroethane in the combined feedstock to the 1,2-dichlorotetrafluoroethane product and its precursors. I have further found that the ratio of said fluorinated ethane products produced in the cell can be varied by varying the ratio of said two feedstocks in the combined feedstock. Thus, in its broadest aspects, the present invention resides in the simultaneous electrochemical fluorination of said two feedstocks so as to obtain increased overall yield of, or overall selectivity to the production of, said products.

An object of this invention is to provide an improved electrochemical fluorination process. Another object of this invention is to provide an electrochemical fluorination process for the more efficient production of 1,2-dichlorotetrafluoroethane and 1,1,2-trichloro-1,2,2-trifluoroethane. Another object of this invention is to provide an electrochemical fluorination process wherein the selectivity to the production of said 1,2-dichlorotetrafluoroethane and 1,1,2-trichloro-1,2,2-trifluoroethane products is increased. Another object of this invention is to provide an electrochemical fluorination process wherein, by charging a mixture of 1,2-dichloroethane and 1,1,2-trichloroethane to the electrochemical fluorination cell, there is obtained (1) increased selectivity to the production of 1,2-dichlorotetrafluoroethane and 1,1,2-trichloro-1,2,2-trifluoroethane, and (2) increased efficiency in the conversion of said 1,1,2-trichloroethane. Other aspects, objects, and advantages of the invention will be apparent to those skilled in the art in view of this disclosure.

Thus, according to the invention, there is provided, in an electrochemical fluorination process which comprises passing an electric current through a current conducting essentially anhydrous liquid hydrogen fluoride electrolyte contained in an electrolytic cell provided with a cathode and an anode, passing either (1) a feedstock comprising 1,2-dichloroethane or (2) a feedstock comprising 1,1,2-trichloroethane into contact with said anode and fluorinating at least a portion of same to fluorinated products including (a) 1,1,2-trichloro-1,2,2-trifluoroethane and (b) 1,2-dichlorotetrafluoroethane, and recovering said products from a cell effluent stream, the improvement comprising: increasing the selectivity of said process to the production of said products (a) and (b) by simultaneously passing said feedstocks (1) and (2) into contact with said anode and fluorinating at least a portion of same to said products.

In the practice of the invention, the mole ratio of said two feedstocks in the combined charge to the cell can be varied over a wide range. Thus, said feedstocks can be charged in a mole ratio of 1,1,2-trichloroethane to 1,2-dichloroethane within the range of 0.1:1 to 20:1, preferably 0.2:1 to 10:1, more preferably 0.3:1 to 5:1. Generally speaking, increasing said ratio increases the production of 1,1,2-trichloro-1,2,2-trifluoroethane.

A number of advantages are realized or obtained in the practice of the invention. These advantages are illustrated more specifically hereinafter in connection with the examples. Said advantages include, among others, the following: (1) Increased selectivity to the overall production of 1,2-dichlorotetrafluoroethane and 1,1,2-trichloro-1,2,2-trifluoroethane. Thus, in the practice of the invention, the overall yield of said two products is increased. (2) Increased efficiency of conversion of 1,1,2-trichloroethane, without any significant sacrifice in the efficiency of the conversion of 1,2-dichloroethane. (3) More efficient utilization of plant equipment including avoiding the inconveniences and complications of changing feedstocks, changing operating conditions in the electrochemical fluorination cell, and changing operating conditions in the separation equipment employed to separate the cell products.

The invention is applicable to any electrochemical fluorination process wherein either 1,2-dichloroethane or 1,1,2-trichloroethane is utilized as a feedstock for the production of 1,2-dichlorotetrafluoroethane and 1,1,2-trichloro-1,2,2-trifluoroethane. Thus, the invention is applicable to electrochemical fluorination processes wherein the feedstock is dissolved in the electrolyte. The invention is also applicable to electrochemical fluorination processes wherein the feedstock is bubbled into the electrolyte through a porous anode. In a presently preferred electrochemical fluorination process, to which the invention is particularly applicable, a current-conducting essentially anhydrous hydrogen fluoride electrolyte is electrolyzed in an electrolysis cell provided with a cathode and a porous anode (preferably porous carbon), and the feedstock is introduced into the pores of said anode and fluorinated within said pores.

Briefly, said preferred electrochemical fluorination process comprises passing the feedstock to be fluorinated into the pores of a porous anode, e.g., porous carbon, disposed in a current-conducting essentially anhydrous hydrogen fluoride electrolyte such as KF· 2 HF. Said feedstock contacts the fluorinating species within the pores of the anode and is therein at least partially fluorinated. Generally speaking, said fluorination can be carried out at temperatures within the range of from −80° to 500° C. at which the vapor pressure of the electrolyte is not excessive. A preferred temperature range is from about 60° to 120° C. Pressures substantially above or below atmospheric can be employed if desired. Generally speaking, the process is conveniently carried out at substantially atmospheric pressures. The feedstock to be fluorinated is preferably introduced into the pores of the anode at a rate such that there is established a pressure balance within the pores of the anode between the feedstock entering the pores of electrolyte attempting to enter said pores from another and opposing direction. Said feedstock flow rate can be within the range of from 3 to 600 milliliters per minute per square centimeter of anode cross-sectional area, taken perpendicular to the direction of flow and expressed in terms of gaseous volume calculated at standard conditions. Current densities employed can be within the range of 30 to X 1,000 , preferably 50 to 500, milliamps per square centimeter of anode geometric surface area. Typical voltages employed can range from 4 to 12 volts. Converted and unconverted products are withdrawn from the pores of the anode and the products recovered from a cell effluent stream.

Further details of said preferred electrochemical fluorination process can be found in copending application Ser. No. 683,089, filed Nov. 2, 1967, by H. M. Fox and F. N Ruehlen, now U.S. Pat. No. 3,511,760.

Referring now to the drawing, the invention will be more fully explained. In the drawing there is illustrated one presently preferred type of electrolytic cell, denoted generally by the reference numeral 10, comprising a cell body 12 having an anode 14 disposed therein. As here illustrated, said anode comprises a cylinder of porous carbon 16 having a core of an essentially impervious carbon 18 disposed therein. The walls of said cylinder of porous carbon extend below the bottom of the core of impervious carbon to form the cavity 20 in the bottom of the anode. A current collector 22, comprising a hollow metal conduit, such as copper, is disposed within said core of impervious carbon and extends therethrough to a point adjacent the bottom thereof. A plastic feed conduit 26 is mounted inside said current collector and extends therethrough into communication with said cavity 20. Said current collector 22 is connected by means of lead 28 to the anode bus of the current supply Preferably, the upper end of said anode 14 extends above electrolyte level 30. A circular 32, here shown to be a cylinder of carbon steel perforated at its upper end portion, surrounds said anode 14 and is connected to the cathode bus of the current supply by a suitable lead wire 34. Any suitable source of current and connections thereto can be employed in the practice of the invention. Said anode 14 can comprise any suitable type of anode which comprises a nonwetting porous element, preferably porous carbon. Said cell contains a suitable electrolyte, e.g., KF· 2 HF. Examples of other anode structures which can be used in the practice of the invention are disclosed and claimed in copending application Ser. No. 680,123, filed Nov. 2, 1967, by W. V. Childs, now U.S. Pat. No. 3,511,762.

In the operation of the cell arrangement, a feedstock comprising 1,2-dichloroethane introduced via conduit 36, and another feedstock comprising 1,1,2-trichloroethane introduced via conduit 38, are mixed in conduit 40 and passed via feed conduit 26 into cavity 20 of anode 14. Preferably, said feedstocks are premixed similarly as shown in the drawing, prior to their introduction into the cell. However, it is within the scope of the invention to introduce said feedstocks simultaneously in other ways, e.g., separately but simultaneously through separate conduits. Said mixed feedstock from conduit 26 forms a gas cap in cavity 20, i.e., displaces a portion of the electrolyte therefrom, and the feedstock enters the pores of the porous section 16 of the anode, travels upward through the pores of said anode, and exits from the upper end of the anode above electrolyte level 30. During passage through the pores of said anode, at least a portion of said feedstock is electrochemically fluorinated. Fluorinated products, together with hydrogen and remaining unconverted feedstock, and possibly some electrolyte vapors, are withdrawn from the space above the electrolyte within the cell 12 via conduit 42 and passed into separation zone 44. Said separation zone can comprise any suitable means for the separation of the materials in the cell effluent stream. For example, said cell effluent stream can be passed through a condenser and knockout drum, or other means for removing HF, and then passed through a suitable series of fractional distillation columns. Recovered hydrofluoric acid electrolyte is returned to the cell via conduit 46. An end product stream comprising monochloropentafluoroethane is withdrawn via conduit 48. A second end product stream comprising 1,2-dichlorotetrafluoroethane is withdrawn via conduit 50. A third end product stream comprising 1,1,2-trichloro-1,2,2-trifluoroethane is withdrawn via conduit 52. A stream of monochlorofluoroethanes comprising 1-chloro-1,1,2,2-tetrafluoroethane; 1-chloro-1,2,2-trifluoroethane; and 1-chloro-2,2-difluoroethane is withdrawn via conduit 54 and passed into conduit 40 for recycle to the cell. Said monochlorofluoroethanes will fluorinate to said end product monochloropentafluoroethane upon being recycled. A stream of dichlorofluoroethanes comprising 1,2-dichloro-1,2,2-trifluoroethane; 1,2-dichloro-1,1-difluoroethane; 1,2dichloro-1,2-difluoroethane; and 1,2-dichloro-1-fluoroethane is withdrawn via conduit 56 and passed into conduit 40 for recycle to the cell. Said dichlorofluoroethanes will fluorinate to said end product 1,2-dichlorotetrafluoroethane upon being recycled. Unreacted 1,2-dichloroethane can be recycled with said dichlorofluoroethanes. A stream of trichlorofluoroethanes comprising 1,1,2-trichloro-2,2-difluoroethane; 1,2,2-trichloro-2-fluoroethane; and 1,1,2-trichloro-2-fluoroethane is withdrawn from separation zone 44 via conduit 58 and passed into conduit 40 for recycle to the cell. Said trichlorofluoroethanes will fluorinate to said end product 1,1,2-trichloro-1,2,2-trifluoroethane upon being recycled. Unreacted 1,1,2-trichlorethane can be recycled with said trichlorofluoroethanes. A stream of light ends comprising chlorofluoroethanes is withdrawn via conduit 60. A stream comprising 1,1,2,2,-tetrachlorodifluoroethane and 1,1,2,2-tetrachlorofluoroethane, together with heavy ends, e.g., dimers, is withdrawn from separation zone 44 via conduit 62. The byproduct hydrogen is also withdrawn from the system by a conduit not shown. The amount of fresh makeup 1,2-dichloroethane feedstock introduced via conduit 36 and the amount of fresh 1,1,2-trichloroethane feedstock introduced via conduit 38 can be adjusted in accordance with the amounts thereof in said recycle streams so as to maintain the desired ratio of said feedstocks.

The following examples will serve to further illustrate the invention.

EXAMPLES

A series of runs was carried out for the electrochemical fluorination of 1,2-dichloroethane and 1,1,2-trichloroethane, individually, and in admixture. The fluorination runs were carried out in a cell embodying the essential features of the cell illustrated in the drawing. The anode 14 had an outside diameter of approximately 4 inches and the porous carbon section 16 thereof had a wall thickness of approximately 1 inch. The porous carbon employed in said anode was a commercial grade designated as PC-45 having a pore volume of about X0.5 cc. per gram with pore diameters ranging from 10 to 100 microns. The average pore diameter was about 58 microns. The electrolyte employed was essentially anhydrous liquid hydrogen fluoride containing potassium fluoride as conductivity additive in the molar ratio of KF·2 HF. Said anode was immersed in said electrolyte to a depth of approximately 12 inches. The feed rates employed were such that the feedstock and fluorinated products traveled upwardly through the pores of the anode and exited therefrom at the top of the anode above the level of the electrolyte. The cell effluent was analyzed by conventional means such as gas-liquid chromatography and mass spectrography. Other operating conditions and the results of the runs in terms of type and quantity of products obtained are given in table I below.

product, i.e., which will fluorinate to said end product upon being recycled to the electrochemical fluorination cell. The most desired and the principal products of the process are: 1,2-dichlorotetrafluoroethane and 1,1,2-trichloro-1,2,2-trifluoroethane. Therefore, for purposes of illustrating the invention, the yields have been reported in terms of said principal products and their precursors.

Referring to the above table I, it will be noted that in Runs 1 and 2 where 1,1,2-trichloroethane was charged alone as the feedstock the yields of A (dichlorofluoroethanes) plus B (trichlorofluoroethanes), in moles per 100 moles of feed reacted, were 76.2 and 75.5, respectively. In Runs 3 and 4 where 1,2-dichloroethane was charged alone as the feedstock the yields of A plus B, in moles per 100 moles of feedstock reacted, were 91.4 and 91.0, respectively. In Runs 5, 6, and 7 where the feedstock was a mixture of said 1,2-dichloroethane and 1,1,2-trichloroethane the yields of A plus B, in moles per 100 moles of feedstock reacted, were 90.3, 91.5, and 91.6, respectively. Thus, in said Runs 5, 6, and 7, the overall yield of A plus B has been markedly increased. This was unexpected because the calculated yield of A plus B in Runs 5 and 6, calculated on the basis of comparable runs wherein the conversion was substantially the same, was only 87.3 and 86.3, respectively. The date in table I also show that, in addition to

TABLE I

| Run Number | 1 | 2 | 3 | 4 | 5 | 6 | 7 |
|---|---|---|---|---|---|---|---|
| Cell temp., °C. | 100 | 99 | 105 | 96 | 100 | 100 | 95 |
| Current, amps | 250 | 250 | 250 | 250 | 250 | 250 | 250 |
| Voltage, volts | 7.3 | 7.5 | 7.3 | 7.8 | 7.3 | 7.3 | 7.6 |
| Feed rate, ml./min./cm.$^2$ (anode geometric surface area): | | | | | | | |
|   Trichloroethane | 1.80 | 1.91 | | | | | |
|   Dichloroethane | | | 1.77 | 2.10 | | | |
|   Total mixture | | | | | 1.52 | 2.17 | 2.13 |
| Feed rate, ml./min./cm.$^2$ (anode cross section area): | | | | | | | |
|   Trichloroethane | 34.0 | 36.0 | | | | | |
|   Dichloroethane | | | 33.4 | 39.6 | | | |
|   Total mixture | | | | | 28.7 | 41.0 | 40.2 |
| Feed rate, moles/hr.: | | | | | | | |
|   Trichloroethane | 4.49 | 4.76 | | | 1.15 | 2.12 | 2.09 |
|   Dichloroethane | | | 4.42 | 5.21 | 2.64 | 3.29 | 3.22 |
|   Total | 4.49 | 4.76 | 4.42 | 5.21 | 3.79 | 5.41 | 5.31 |
| Feed converted, percent: | | | | | | | |
|   Trichloroethane | 42.3 | 37.7 | | | 33.2 | 28.3 | 24.8 |
|   Dichloroethane | | | 37.9 | 45.0 | 47.8 | 37.9 | 35.0 |
| Products, mole percent. | | | | | | | |
|   Monochlorofluoroethanes | 1.36 | 1.42 | 4.75 | 4.04 | 4.40 | 4.27 | 3.86 |
|   (A) Dichlorofluoroethanes | 7.66 | 7.80 | 80.95 | 86.25 | 58.27 | 56.14 | 55.42 |
|   (B) Trichlorofluoroethanes | 73.08 | 71.48 | 11.55 | 6.86 | 33.86 | 36.49 | 36.57 |
|   Tetrachlorofluoroethanes | 11.94 | 12.92 | Trace | Trace | 1.39 | 1.80 | 1.78 |
|   Dimers | 5.96 | 5.49 | 1.69 | 2.52 | 2.08 | 1.22 | 1.07 |
|   C$_1$ compounds | Trace | 0.89 | 1.06 | 0.33 | Trace | 0.08 | 1.30 |
|   Total | 100.00 | 100.00 | 100.00 | 100.00 | 100.00 | 100.00 | 100.00 |
| Yield of A+B, moles/100 moles of feed reacted | 76.2 | 75.5 | 91.4 | 91.0 | 90.3 | 91.5 | 91.6 |
| Calculated [1] yield of A+B, moles/100 moles of feed reacted | | | | | [2] 87.3 | [3] 86.3 | [3] 86.4 |

[1] Calculated by combining products that would be obtained by reacting each feedstock separately at the same conversion level shown in each case.
[2] Product distributions taken from Runs 2 and 4.
[3] Product distributions taken from Runs 2 and 3.

In the above table I, the data are presented in terms of monochlorofluoroethane products, dichlorofluoroethane products, trichlorofluoroethane products, and tetrachlorofluoroethane products. The monochlorofluoroethane products include the end product monochloropentafluoroethane and the other monochlorofluoroethanes which are precursors for said end product, i.e., which will fluorinate to said end product on being recycled to the electrochemical fluorination cell. The dichlorofluoroethane products include the end product 1,2-dichlorotetrafluoroethane and the other dichlorofluoroethanes which are precursors for said end product, i.e., which will fluorinate to said end product upon being recycled to the electrochemical fluorination cell. The trichlorofluoroethane products include the end product 1,1,2-trichloro-1,2,2-trifluoroethane and the other trichlorofluoroethanes which are precursors for said end increasing the yield of A plus B, the efficiency of the conversion of 1,1,2-trichloroethane to 1,1,2-trichloro-1,2,2-trifluoroethane and its precursors has been increased without any significant sacrifice in the efficiency of the conversion of 1,2-dichloroethane to 1,2-dichlorotetrafluoroethane and its precursors.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. In an electrochemical fluorination process which comprises passing an electric current through a current-conducting, essentially anhydrous liquid hydrogen fluoride electrolyte contained in an electrolytic cell provided with a cathode and a porous anode, passing a feedstock (1) comprising 1,2-dichloroethane into a said cell and into the pores of a said anode therein, separately passing a feedstock (2) comprising 1,1,2-trichloroethane into a said cell and into the pores of a said anode therein, fluorinating at least a portion of each said feedstock within said pores to fluorinated products including (a) 1,1,2-trichloro-1,2,2-trifluoroethane and (b) 1,2-dichlorotetrafluoroethane, and recovering said products from a cell effluent stream, the improvement comprising: increasing the selectivity of said process for the total production of said products (a) and (b) by simultaneously passing both of said feedstocks (1) and (2) into the pores of the same said anode and therein fluorinating at least a portion of same to said products.

2. A process according to claim 1 wherein said two feedstocks 1,1,2-trichloroethane and 1,2-dichloroethane are passed into said cell in a trichloroethane to dichloroethane mole ratio within the range of 0.1:1 to 20:1.

3. A process according to claim 2 wherein said feedstocks are premixed prior to introduction into said cell.

4. A process according to claim 3 wherein the range of said ratio is 0.3:1 to 5:1.

5. A process according to claim 1 wherein: said anode comprises a porous carbon element; and said two feedstocks (1) and (2) are introduced into the pores of said porous carbon element and are therein at least partially fluorinated to said products.

6. A process according to claim 5 wherein: said feedstocks are introduced at a total feed rate within the range of from 3 to 600 milliliters per minute per square centimeter of porous carbon cross-sectional area; said fluorination is carried out at a cell temperature within the range of from about 60° to about 120° C.; the current density employed is within the range of from 50 to 500 milliamps per square centimeter of porous carbon anode geometric surface area; said cell effluent stream is passed to a products separation zone; a first product stream comprising 1,1,2-trichloro-1,2,2-trifluoroethane is withdrawn from said products separation zone; a second product stream comprising 1,2-dichlorotetrafluoroethane is withdrawn from said products separation zone; a first recycle stream comprising unreacted 1,2-dichloroethane and dichlorofluoroethanes which are precursors for and will fluorinate to 1,2-dichlorotetrafluoroethane product is withdrawn from said separation zone and recycled to said cell; and a second recycle stream comprising unreacted 1,1,2-trichloroethane and trichlorofluoroethanes which are precursors for and will fluorinate to said 1,1,2-trichloro-1,2,2-trifluoroethane product is withdrawn from said separation zone and recycled to said cell.

7. A process according to claim 6 wherein said two feedstocks 1,1,2-trichloroethane and 1,2-dichloroethane are passed into the pores of said porous carbon anode in a trichloroethane to dichloroethane mole ratio within the range of from 0.1:1 to 20:1.

8. A process according to claim 7 wherein: the range of said ratio is 0.3:1 to 5:1; the amount of fresh feedstocks (1) and (2) introduced into the cell is adjusted in accordance with the amount of said feedstocks in said first and second recycle streams so as to maintain said ratio within said range; and said feedstocks (1) and (2), and said first and second recycle streams, are premixed prior to introduction into said cell.

* * * * *